United States Patent
Sand

(10) Patent No.: US 9,657,795 B2
(45) Date of Patent: May 23, 2017

(54) STAND ALONE LIQUID COOLED BRAKE SYSTEM

(71) Applicant: Richard Annis, Queen Creek, AZ (US)

(72) Inventor: Darrel R. Sand, Okemos, MI (US)

(*) Notice: Subject to any disclaimer, the term of this patent is extended or adjusted under 35 U.S.C. 154(b) by 0 days.

(21) Appl. No.: 14/224,604

(22) Filed: Mar. 25, 2014

(65) Prior Publication Data

US 2014/0202807 A1 Jul. 24, 2014

Related U.S. Application Data

(63) Continuation of application No. 12/834,347, filed on Jul. 12, 2010, now abandoned.

(60) Provisional application No. 61/224,711, filed on Jul. 10, 2009.

(51) Int. Cl.
| | |
|---|---|
| *F16D 65/813* | (2006.01) |
| *F16D 65/833* | (2006.01) |
| *F16D 65/08* | (2006.01) |
| *B60K 11/02* | (2006.01) |
| *F16D 65/78* | (2006.01) |
| *F16D 69/00* | (2006.01) |

(52) U.S. Cl.
CPC ........... *F16D 65/833* (2013.01); *F16D 65/08* (2013.01); *F16D 65/813* (2013.01); *B60K 11/02* (2013.01); *F16D 2065/784* (2013.01); *F16D 2065/788* (2013.01); *F16D 2069/002* (2013.01)

(58) Field of Classification Search
CPC ...... F16D 65/06; F16D 65/813; F16D 65/833; F16D 2065/784; F16D 2065/788

USPC ................... 188/250 R–250 B, 264 R, 264 D
See application file for complete search history.

(56) References Cited

U.S. PATENT DOCUMENTS

| | | | |
|---|---|---|---|
| 1,758,253 A | 5/1930 | Greenwood | |
| 2,012,662 A * | 8/1935 | Frank | F16D 65/833 188/264 D |
| 2,161,363 A | 6/1939 | Malcolm | |
| 2,431,774 A | 12/1947 | Schumacher | |
| 2,518,016 A | 8/1950 | Johnson et al. | |
| 2,692,118 A | 10/1954 | Holloway | |
| 2,850,125 A * | 9/1958 | True | B66D 5/023 188/218 R |
| 2,911,075 A | 11/1959 | Damiron | |
| 2,966,241 A | 12/1960 | Martin | |
| 2,986,239 A | 5/1961 | Sanford | |
| 3,000,472 A * | 9/1961 | Sturgis | F16D 51/18 188/218 R |
| 3,044,736 A | 7/1962 | Chambers | |
| 3,047,103 A | 7/1962 | Schwartz | |
| 3,047,105 A | 7/1962 | Schwartz | |

(Continued)

*Primary Examiner* — Thomas Irvin
(74) *Attorney, Agent, or Firm* — Jackson White, PC; Steven J. Laureanti

(57) ABSTRACT

A fluid cooled vehicle brake includes a fluid flow passage disposed in fluid communication with a brake shoe rim carrying a layer of friction material. A pair of spaced support webs are coupled to an inner surface of an annular inner surface of the rib. A water jacket is sealingly joined to the pair of webs and the inner surface of the rim to form a fluid flow passage between an inlet port formed in one of the support webs along the inner surface of the rim and out through an outlet port formed in one of the support webs. High thermal conductive members may be disposed within the layer of friction material to conduct heat to the rim. Heat radiator members are mounted within the coolant passageway.

12 Claims, 10 Drawing Sheets

(56) References Cited

U.S. PATENT DOCUMENTS

| | | | |
|---|---|---|---|
| 3,061,053 A | 10/1962 | Hibbard | |
| 3,473,636 A | 10/1969 | Sand | |
| 3,516,522 A | 6/1970 | Chamberlain | |
| 3,987,872 A | 10/1976 | Sabes | |
| 4,113,067 A | 9/1978 | Coons et al. | |
| 4,415,067 A | 11/1983 | Cory | |
| 4,470,484 A | 9/1984 | Norgren | |
| 4,736,821 A | 4/1988 | Ries | |
| 4,815,573 A | 3/1989 | Miyata | |
| 4,883,149 A | 11/1989 | Campbell et al. | |
| 5,224,578 A | 7/1993 | Rheinheimer et al. | |
| 5,341,903 A | 8/1994 | Tietje | |
| 5,358,077 A | 10/1994 | DeConti | |
| 5,558,183 A | 9/1996 | Way | |
| 6,186,285 B1 | 2/2001 | Parsons | |
| 6,321,879 B2 | 11/2001 | Nakamura | |
| 6,419,054 B1 | 7/2002 | Schulba | |
| 6,491,139 B1 | 12/2002 | Budica | |
| 6,528,132 B1 | 3/2003 | Naerheim | |
| 7,036,640 B2 | 5/2006 | Spielman | |
| 2005/0279595 A1 | 12/2005 | Kallenbach et al. | |
| 2006/0157002 A1 | 7/2006 | Pfeffinger et al. | |
| 2006/0207842 A1 | 9/2006 | Strandberg | |
| 2007/0056816 A1* | 3/2007 | Hayford | F16D 65/04 188/250 B |
| 2007/0095622 A1 | 5/2007 | Mayberry et al. | |
| 2007/0158151 A1 | 7/2007 | Deconti | |
| 2008/0121476 A1 | 5/2008 | James et al. | |
| 2008/0216777 A1 | 9/2008 | Vetrovec | |
| 2009/0032344 A1 | 2/2009 | Thompson | |
| 2014/0202807 A1 | 7/2014 | Sand | |

\* cited by examiner

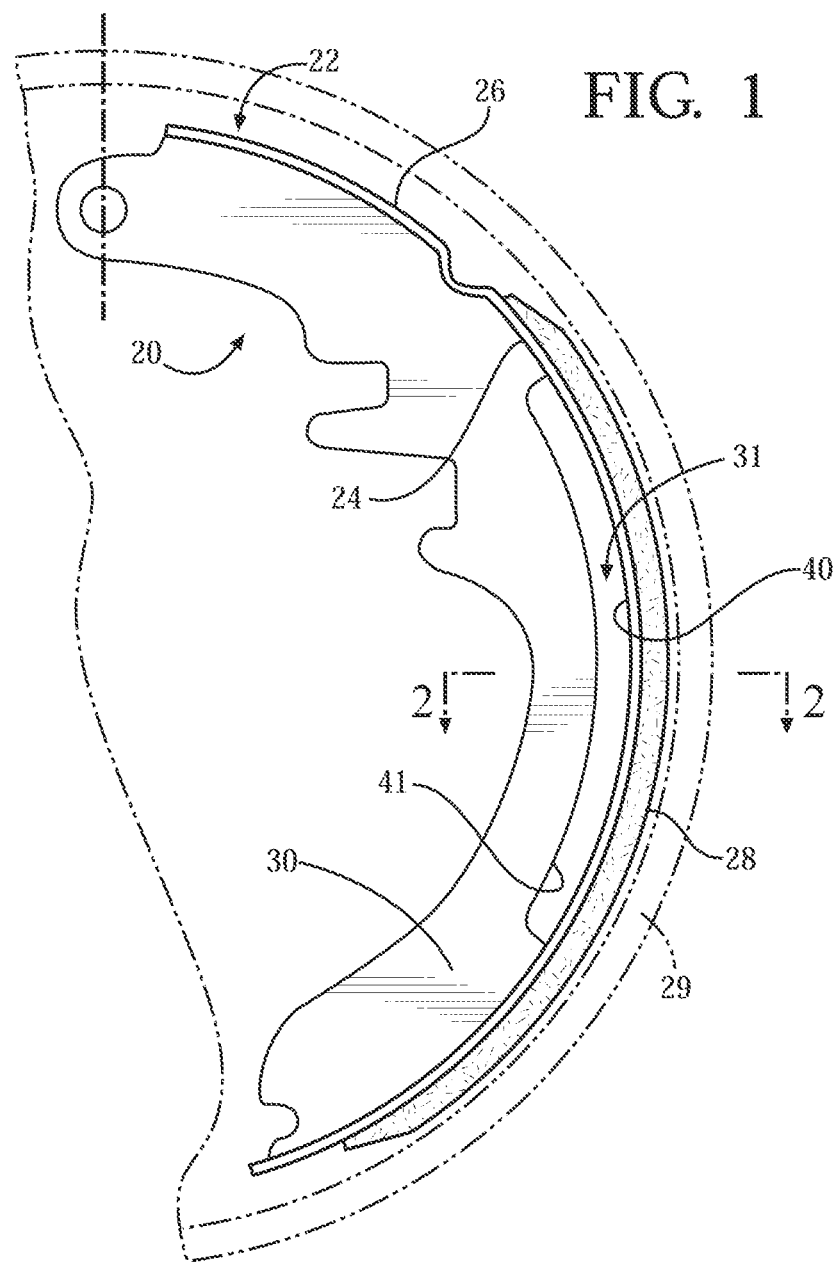
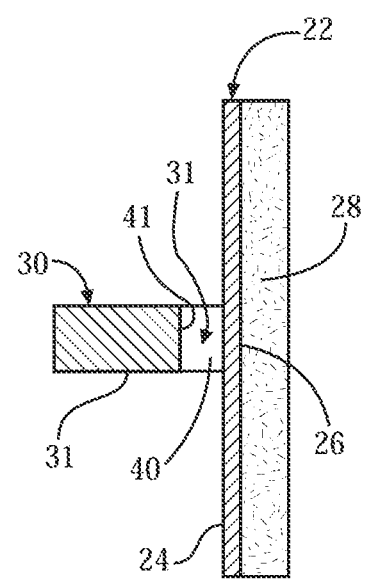
FIG. 1
FIG. 2

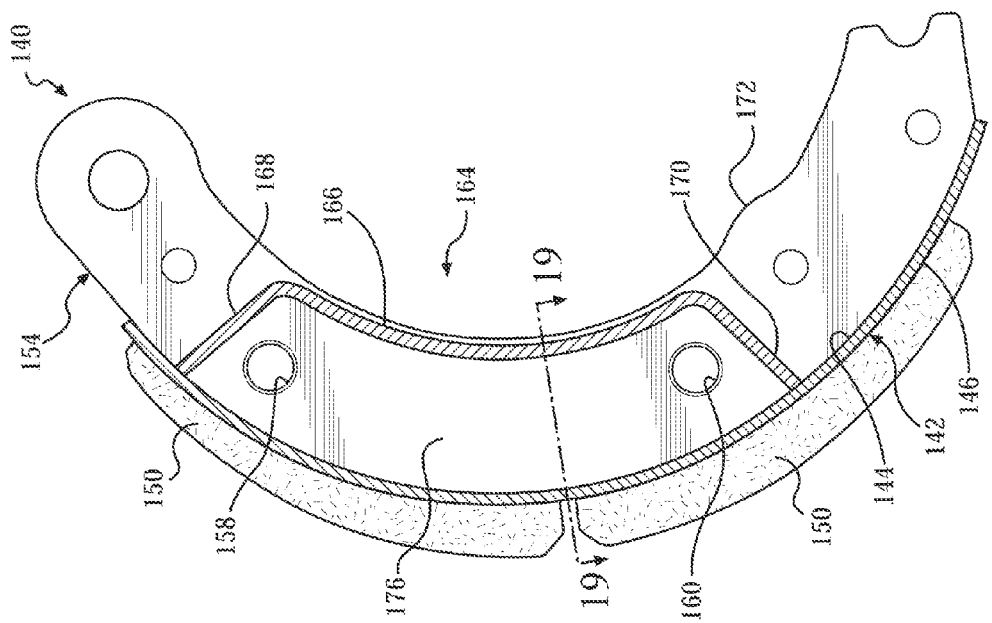
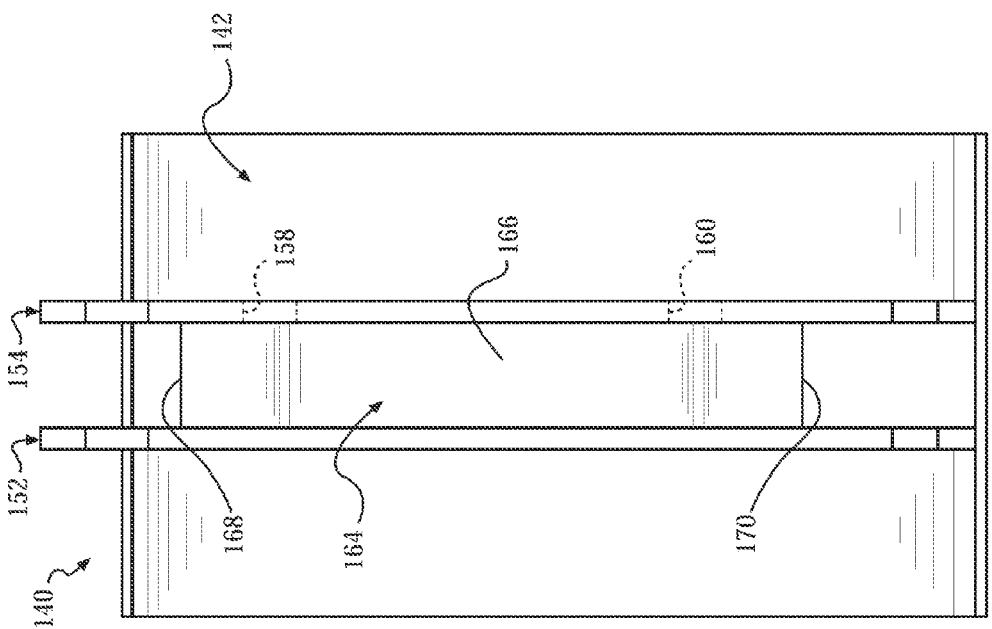

STAND ALONE LIQUID COOLED BRAKE SYSTEM

CROSS REFERENCE TO CO-PENDING APPLICATIONS

This application is a continuation-in-part of U.S. application Ser. No. 12/834,347, filed Jul. 12, 2010, which claims priority benefit to the Jul. 10, 2009 filing date of U.S. Provisional Patent Application Ser. No. 61/224,711 for "Liquid Cooled Brake", all filed in the name of Darrel Sand, the entire contents of all of which are incorporated herein in its entirety.

BACKGROUND

It is known in the field of vehicle brakes to provide liquid cooling of the brake lining in order to minimize the brake wear and to maintain maximum braking power. Numerous attempts have been made to provide liquid coolant flow to the vehicle brake shoe. It is believed that further improvements can be made to liquid cooled brakes.

SUMMARY

A vehicle brake includes a brake shoe having an annular rim carrying a layer of a brake friction material on a radially outer surface. A fluid flow passage is carried on a radially inner surface of the rim for circulating fluid past the rim to remove heat from the rim and the layer of brake friction material when the layer of brake friction material engages a rotating brake member.

The fluid passage is formed by a water jacket sealing joined to a pair of webs extending radially inward from the inner surface of the rim.

An inlet port and an outlet port are formed in either one of the pair of webs and receive fluid connections for coupling fluid carrying members, hoses or conduits to the inlet and outlet ports to provide a fluid flow path for coolant fluid through the inlet port, along the fluid flow passage, and out through the outlet port.

The water jacket can be a one piece member disposed between the pair of support webs and joined along exterior edges to the pair of support webs and the radial inner surface of the rim to form the closed fluid flow passage.

An inner central wall of the water jacket may have an arcuate shape complimentary to the arcuate shape of the inner edges of the pair of support webs.

The fluid flow passage may be integrally formed with the rim.

In one aspect, substantially all of the annular rim and at least a portion of the water jacket can be formed of the friction material.

In another aspect, a heat conductive member is disposed within the layer of brake friction material and coupled in heat transfer relationship with the rim.

A plurality of heat conductive members may be disposed within the layer of brake friction material and coupled in heat transfer relationship with the rim. The heat conductive member is at least one body formed of a high thermal conductive material.

A heat radiator member can be coupled in heat transfer relationship with the rim, and disposed in the fluid flow passageway. A heat conductive member can be disposed with the layer of brake friction material, and axially aligned with the heat radiator.

BRIEF DESCRIPTION OF THE DRAWING

The various features, advantages and other uses of the present liquid cool brake will become more apparent by referring to the following detailed description and drawing in which:

FIG. 1 is a side elevational view of one aspect of a liquid cooled vehicle brake;

FIG. 2 is a cross-sectional view generally taken along line 2-2 in FIG. 1;

FIG. 17 is a front elevational view of the liquid cooled brake shown in FIG. 16;

FIG. 18 is a longitudinal cross-sectional view generally taken along line 18-18 in FIG. 16;

DETAILED DESCRIPTION

Figure 3:
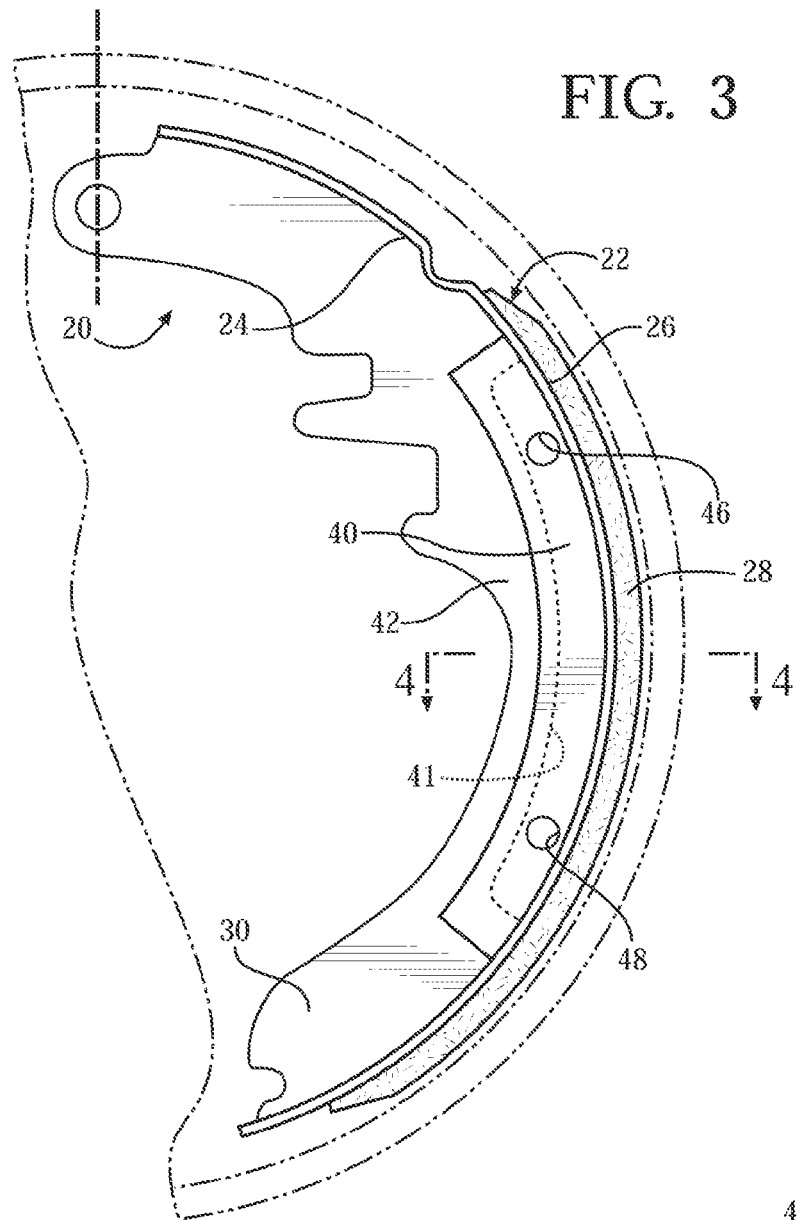
FIG. 3 is a diagrammatic side elevational view of another aspect of a liquid cooled brake.

Referring now to the FIGS. 1-20 of the drawing, various aspects of a liquid cooled vehicle brake system are depicted.

Generally, as shown in FIGS. 1 and 2, a typical vehicle brake assembly, such as a vehicle brake assembly used in automobiles and trucks, includes at least one moveable brake member, such as a brake shoe 20, which engages a rotating brake member, such as a brake drum 29. The brake shoe 20 is formed with an arcuate rim 22, typically of metal, which has a radially inward facing surface 24 and a radially outward facing surface 26. A layer of a brake friction material 28 is securely fixed or bonded to the outer surface 26 of the rim 22. The layer of friction material 28 is designed to engage the brake drum 29.

A coolant fluid flow passageway 31 includes an arcuate web 30 extending intermediately between opposed side edges of the radially inward facing surface 24 of the rim 22. The web 30 has a thin, flange-like shape and can be integrally formed as part of the rim 22 or fixedly joined to the rim 22 by welding, mechanical fasteners, etc. The web 30 adds stiffness to the arcuate rim 22 to resist the forces encountered during movement of the brake shoe 20 into frictional engagement with the rotating vehicle brake drum 29.

According to a first aspect, a coolant passage 40 is formed in fluid flow contact or communication with the inner surface 24 of the rim 22 at a location on the inner surface 24 where the maximum temperature during braking is encountered. The coolant passage 40 extends completely through the web 30 between one side of the web 30 and the opposite side of the web 30. The coolant passage 40 may have any arcuate length and can be centered at the arcuate center of the rim 22 where maximum braking temperatures are typically encountered. For example, the passage 40 is in the form of a lateral bore 41 formed intermediately between the arcuate ends of the web 30.

Connections to a fluid flow system are provided to the coolant passage 40 as described hereafter.

Figure 4:
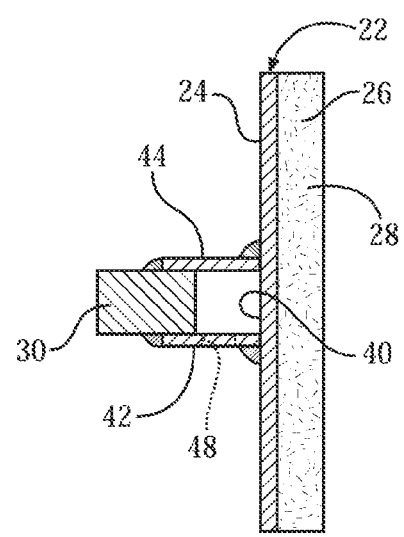
FIG. 4 is a cross-sectional view generally taken line 4-4 in FIG. 3.

Another aspect of the liquid cooled brake is shown in FIGS. 3 and 4. In this aspect, the brake shoe 20 and coolant passage 40 are constructed in the same manner as described above and shown in FIG. 1. In this aspect, the opposite side edges of the coolant passage 40 are closed off and covered by the gussets 42 and 44. Each gusset 42 and 44 has an overall length, width and shape to close off one entire exposed surface or opening of the coolant passage 40 when the gusset 42 or 44 is fixedly mounted to the brake shoe web 30 by means of welding, mechanical fasteners, such as rivets for example, etc.

At least one of the gussets 42 or 44, with gusset 42 being shown by way of example, has a first, inlet aperture 46 and a second, outlet aperture 48 typically located at opposite ends of the gusset 42. Fluid connectors are fixedly mounted in each aperture 46 and 48 to provide fluid flow through the inlet 46 into and through the fluid passage 40 to the outlet 46 for maximum heat transfer from the brake shoe 20. The fluid connectors can be any connection suitable for fluidically coupling flexible hoses or rigid pipes to the inlet and outlet ends of the passageway 40, such as pipe unions, quick connectors, etc.

Figure 5:
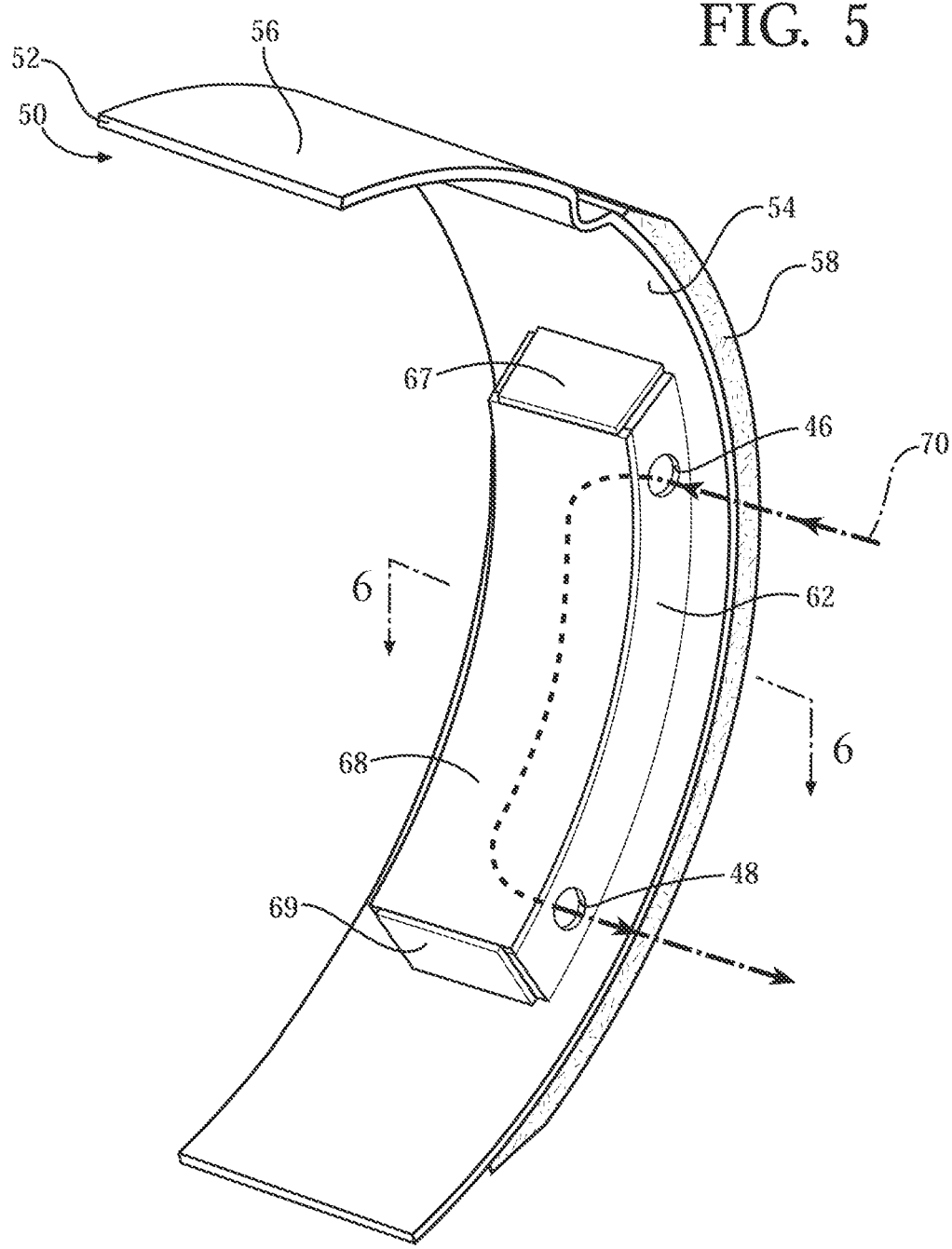
FIG. 5 is a perspective view of another aspect of a liquid cooled brake.
Figure 6:
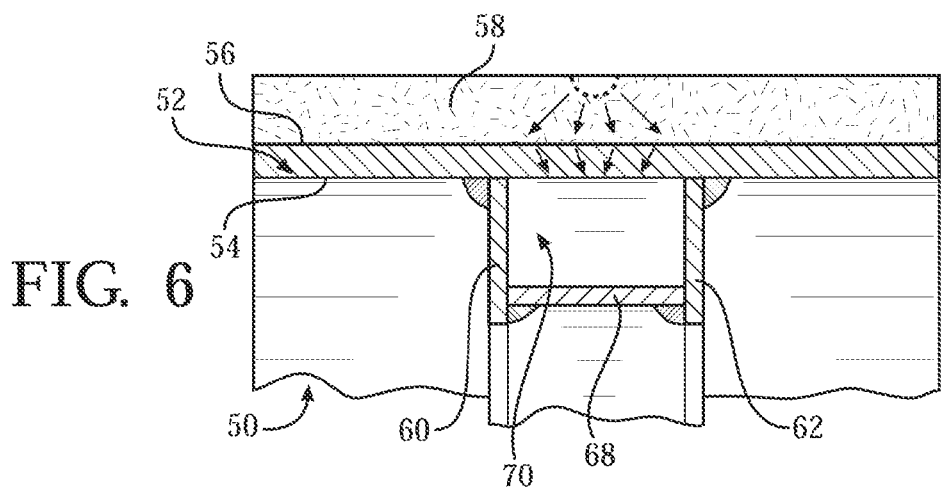
FIG. 6 is a cross-sectional view generally taken along 6-6 in FIG. 5.

Referring now to FIGS. 5 and 6, there is depicted yet another aspect of a brake shoe 50 which is constructed similarly to the brake shoe 20 described above and shown in FIGS. 1-4 in that brake shoe 50 includes an arcuate rim 52 having a first radially inward extending inner surface 54 and an opposed, second radially outward facing, outer surface 56. A layer of brake friction material 58 is fixedly mounted on the outer surface 56.

The brake shoe 50 includes two spaced webs 60 and 62. Radial inward edges 64 and 66 of the first and second web 60 and 62, respectively, are closed off by an inner wall or gusset 68 which can be joined to the webs 60 and 62 by welding, mechanical fasteners, or any other joining technique suitable for use in a vehicle brake application.

The webs 60 and 62 and the inner wall 68 form a coolant passage 70 adjacent to the rim 52 which extends from an inlet 67 at one end of the webs 60 and 62 to an outlet 69 at the opposite end of the webs 60 and 62. Fluid connectors are mounted in the inlet 67 and the outlet 69. The coolant passage 70 places the liquid coolant flow at the longitudinal center of the rim 52 and the brake friction lining material 58 which is exposed to the highest braking temperature. The distance between the outer surface of the layer of braking material 58 and the liquid coolant in the passage 70 is minimized so as to maximize heat transfer efficiency.

As shown in FIG. 5, the inner wall 68 is sealingly joined to two end walls 67 and 69 which are in turn welded to opposite ends of the inner wall 68 and the adjoin surfaces of the end of the webs 60 and 62. This forms a sealed coolant passage extending between an inlet port 46 and an outlet 48. Suitable fluid hose or conduit connections, such as thread connectors, not shown in FIG. 5, are threaded or otherwise fixed, such as by welding, to the ports 46 and 48 to provide fluid flow from a fluid source through the inlet 46, along the coolant passage 70 within the sealed walls 67, 68, and 69 and the webs 60 and 62 and out through the outlet port 48.

It will be understood that the inner wall 68 and the end wall 66 and 69 may be integrally formed as a one piece member. Further, the end of wall 67 and 69 may have a smaller width than the width of the inner wall 68 so as to fit in between the opposed ends of the webs 60 and 62.

A water jacket is sealingly coupled to a pair of wet port webs carried on the rim to create the fluid flow passage in conjunction with the pair of support webs.

Figure 7:
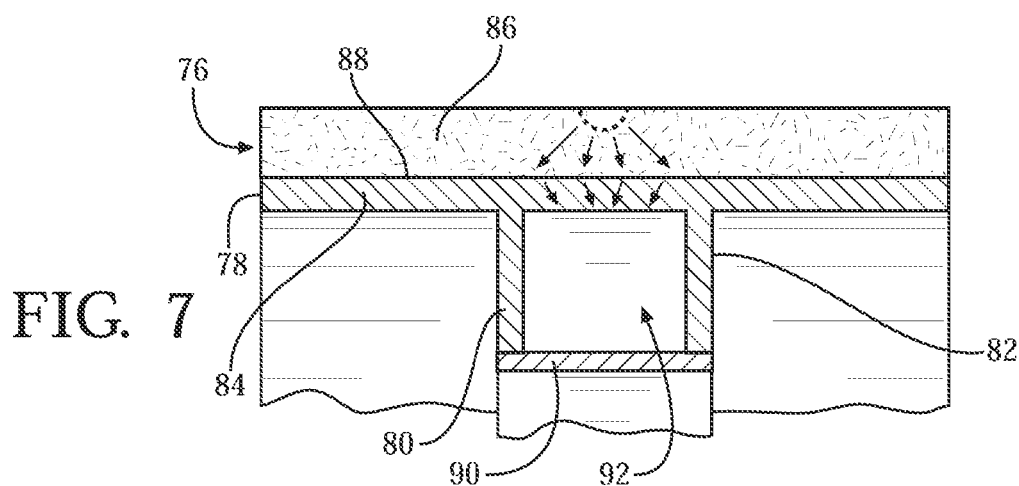
FIG. 7 is a cross-sectional view, similar to FIG. 6, but depicting another aspect of a liquid cooled brake.

The dual webs 60 and 62 and the inner endwall 68 may also be implemented as an integral part of a cast or molded brake shoe 76 are shown in FIG. 7. In this aspect, the brake shoe 70 is formed of a one piece molded or cast body having a rim portion 78 and first and second webs 80 and 82 extending radially inward from an inner surface 84 of the rim portion 78. A brake lining 86 formed of a friction material is fixedly mounted on an outer surface 88 of the rim portion 78. An inner wall 90 is fixed to the radial inner ends of the ribs 80 and 82 to close off the interior space between the webs 80 and 82 and the rim portion 78 to form a coolant passage 82 extending between opposite ends of the webs 80 and 82. Fluid connectors are coupled to the opposite ends of the coolant passage 82.

Figure 8:
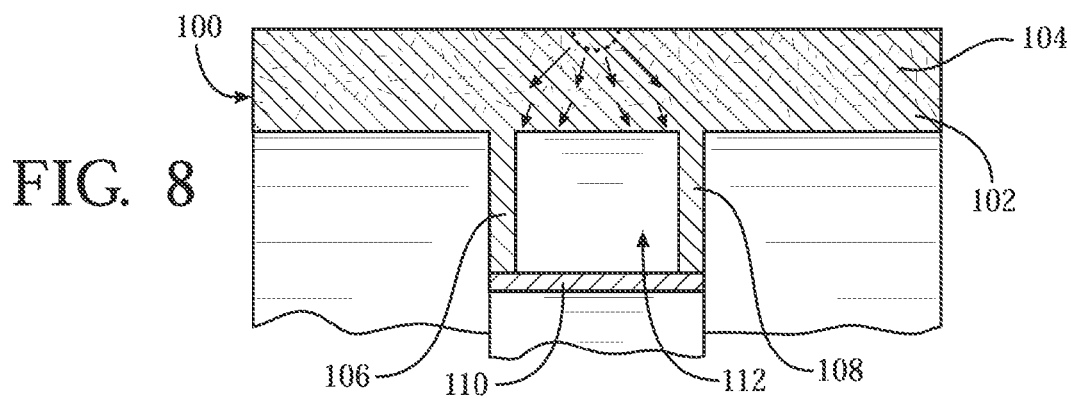
FIG. 8 is a cross-sectional view, similar to FIGS. 6 and 7, but depicting yet another aspect of a liquid cooled brake.

In the aspect shown in FIG. 8, the brake shoe 100 is a one piece cast brake shoe which includes an integral one piece unitary body formed of a brake friction material thereby combining a rim portion 102, an outer portion of brake friction material 104, and first and second inner webs 106 and 108 into a unitary body. The radial inner ends of the webs 106 and 108 are again closed off by an inner wall 110 to form a coolant passage 112 extending between opposite ends of the webs 106 and 108. Fluid connectors are coupled to the opposite ends of the coolant passage 112.

Figure 9:
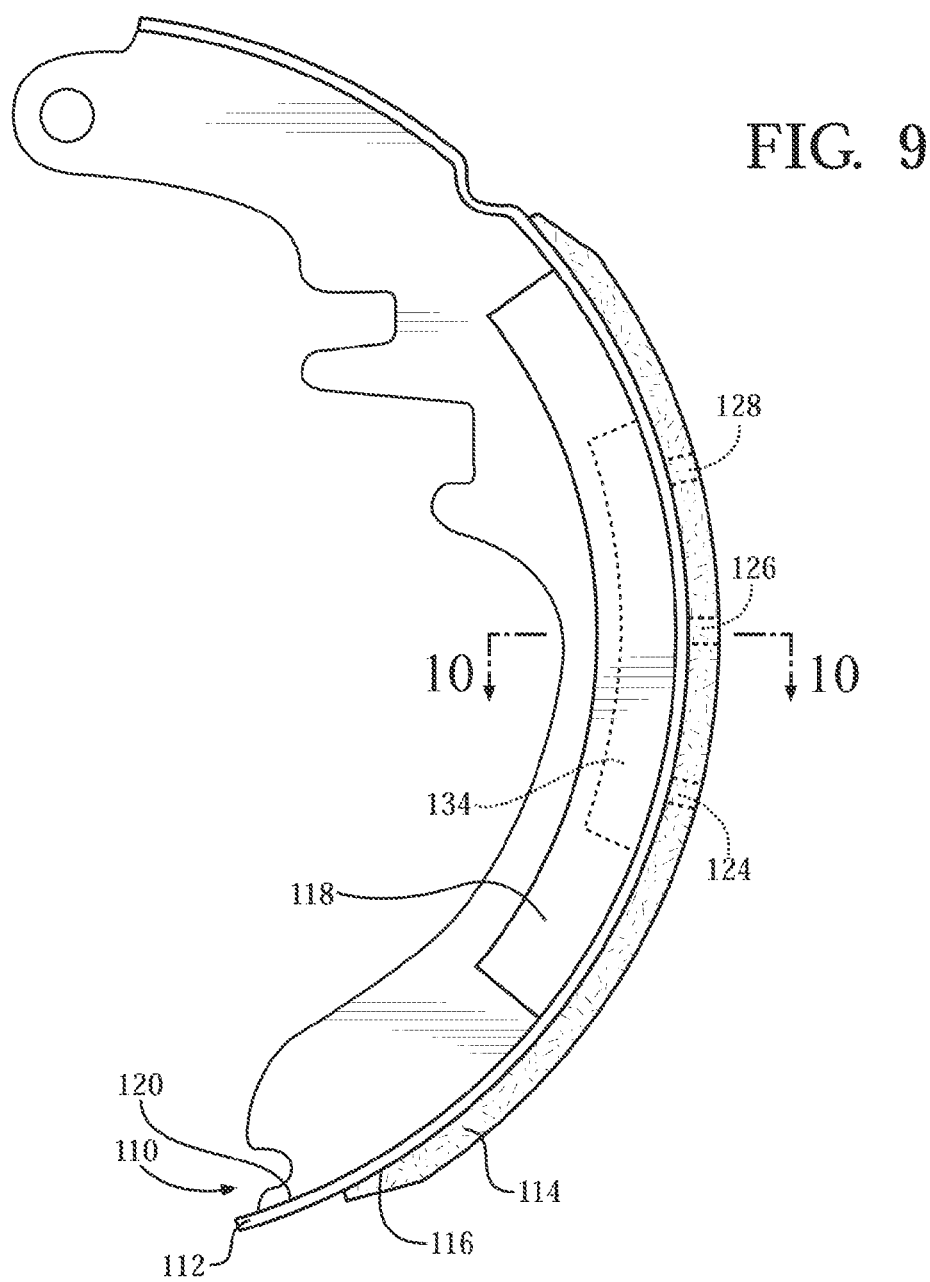
FIG. 9 is a side elevational view of another aspect of a liquid cooled vehicle brake.
Figure 10:
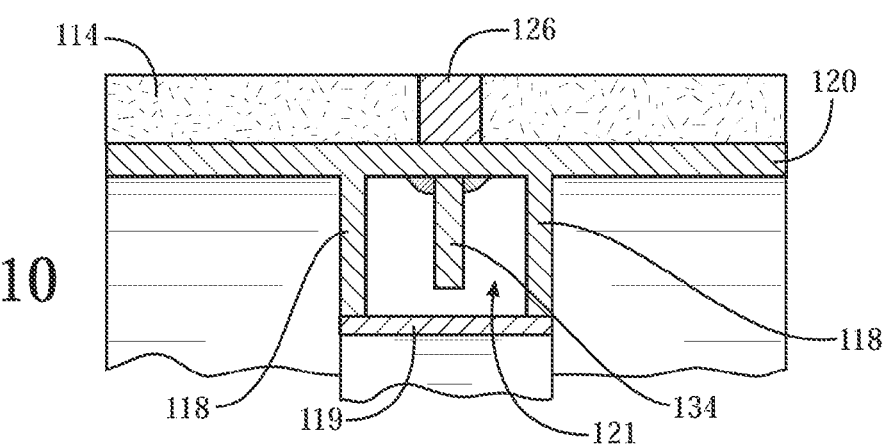
FIG. 10 is a cross sectional view generally taken along line 10-10 in FIG. 9.
Figures 11, 12:
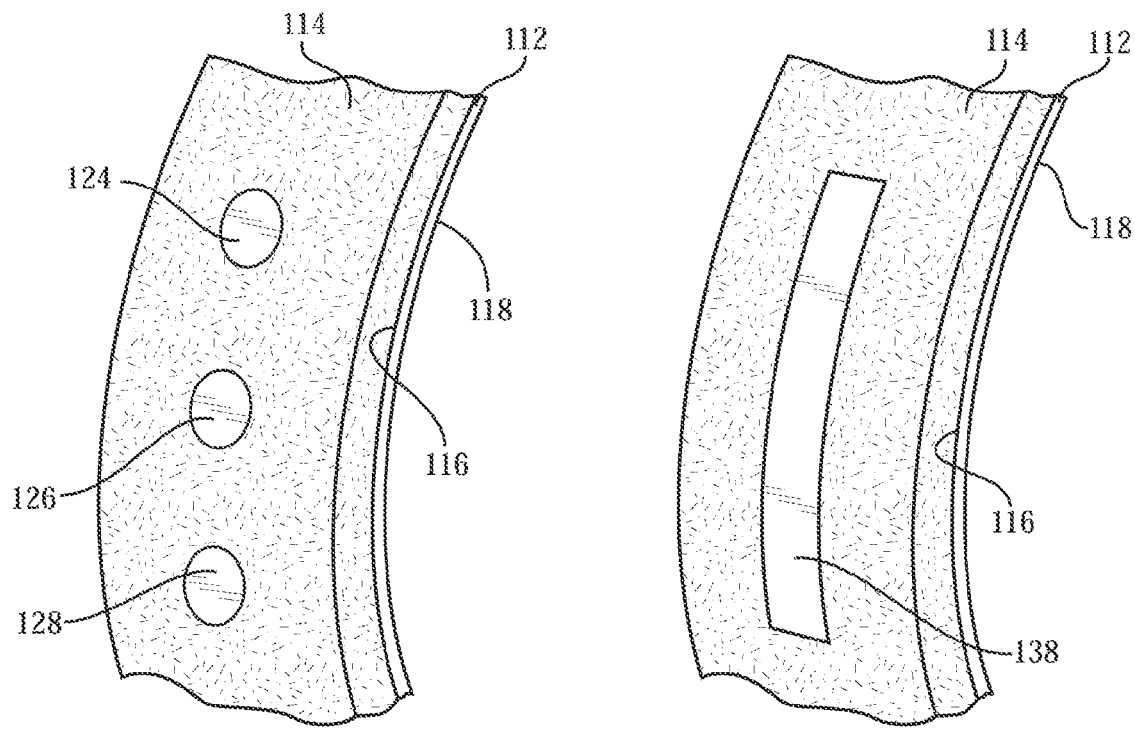
FIG. 11 is a partial front perspective view of the liquid cooled vehicle brake shown in FIG. 9.
FIG. 12 is a partial front elevational view of a modification to the liquid brake shown in FIG. 11.

A brake shoe 110 shown in FIGS. 9, 10, and 11 includes an arcuate rim 112 having a layer 114 of a brake lining or friction material bonded or otherwise securely mounted on an outer surface 116 of the rim 112. A closed web 118 similar to the webs shown in any of FIGS. 1-8, extends radially inward from an inner surface 120 of the rim 112.

In this aspect, heat conductive means in the form of one or more heat conductive members, with three circumferentially spaced heat conductive members 124, 126, and 128 being shown by way of example only, are mounted within the layer 114 of brake friction material. The heat conductive members 124, 126, and 128 may be sintered or integrally cast as part of the friction material layer 114 or fixedly mounted in the layer 114 after the layer 114 has been bonded or otherwise mounted to the outer surface 116 of the rim 112 by forming bores in the layer 114 and then inserting and fixedly securing each of the heat conductive members 124, 126 and 128 in the layer 114.

The heat conductive members 124, 126, and 128 are preferably formed of a highly thermal or heat conductive material, such as copper, copper alloy, etc.

The radially outer end or surface of each of the heat conductive members 124, 126, and 128 may be covered by an outer portion of the layer 114 of brake friction material or exposed through the outer surface of the layer 114 as shown in FIGS. 9, 10, and 11.

The heat conductive members 124, 126, and 128 function to rapidly transfer heat generated during vehicle braking in the surrounding wheel drum, not shown, and in the brake friction lining or layer 114 to the rim 112 where the heat is transferred to the liquid coolant flowing through the flow passage 121 formed between the one or more webs, with two webs 118 and an inner wall 119 being shown in FIG. 10 by way of example only.

FIGS. 9 and 10 also depict another feature of this aspect of the liquid cooled brake in which one or more heat radiators or fins 134 are fixed in thermal flow communication with the rim 122 by means of welding, integral casting, etc. Each heat radiator or fin 134 projects into the coolant flow passage 121 so as to expose a large surface area for the heat transferred through the heat conductive members 124, 126, and 128 in the rim 122 to the coolant flow in the passage 121 for efficient heat removal and brake cooling.

The heat radiator or fin 134 is shown in FIG. 9, may have any shape or length. It is desirable for efficient heat transfer for the heat radiator or fin 134 to have a length that extends at least across the entire arcuate expanse of the heat conductive members 124, 126, and 128.

The heat conductive members 124, 126, and 128 may have other shapes, lengths, and widths as shown, by way of example only, in FIG. 12. In this modification, a single heat conductive member 138 is provided in the form of an elongated strip substantially centered about the circumferential center of the brake lining 114 where breaking temperatures are at a maximum.

Figure 13:
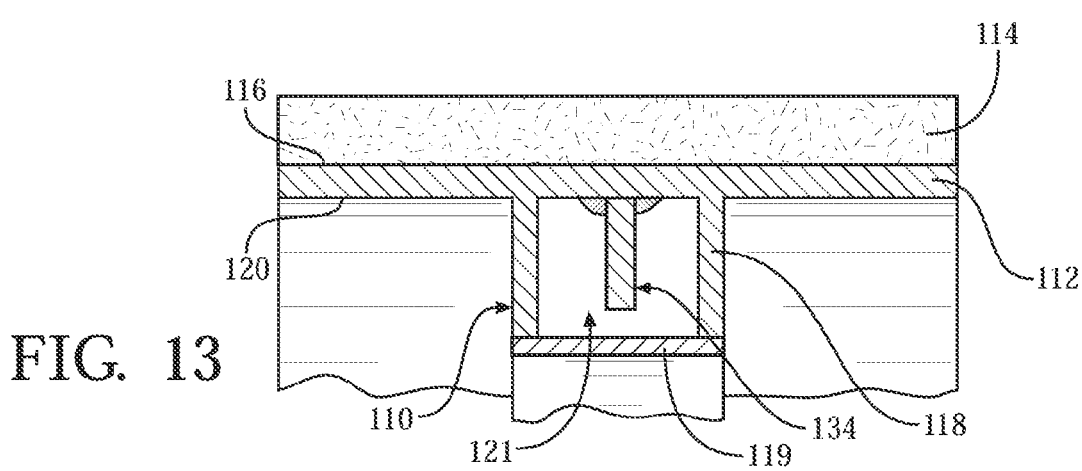
FIG. 13 is a cross sectional view, similar to FIG. 10, but showing another aspect of a liquid cooled vehicle brake.

It will be understood that the heat conductive members 124, 126 and 128 or the heat conductive member 138 may be used independently and separately from the heat radiator or fin 134. As shown in FIG. 13, the heat radiator or fin 134 may also be used independently of the heat conductive members 124, 126 and 128 or 138.

Referring now to FIGS. 16-20, there is depicted another aspect of a liquid cooled brake 140. The liquid cooled brake 140 includes an annular rim 142 with an inner surface 144 and a radially opposed outer surface 146. A layer of brake friction material 150, formed as one or multiple separate pads or layers, is mounted on the outer surface 146 of the rim 142 for contacting the brake drum.

A pair of curved webs 152 and 154 are fixed, such as by welding, to the inner surface 144 of the rim 142. The webs 152 and 154 include connections to the brake cylinder for effecting radial movement of the entire brake shoe 140 into and out of engagement with the surrounding wheel brake drum. As shown in FIG. 16-20, the webs 152 and 154 are spaced apart.

A pair of bores are formed in one of the webs, such as web 154, to create an inlet port 158 and an outlet port 160. Alternately, the bores forming the inlet and outlet ports 158 and 160 may be located within one web 152 and the other in the other web 154.

A water jacket 164 is securely and sealingly attached to the webs 152 and 154 to form a coolant flow passage in conjunction with the inlet port 158 and the outlet port 160.

Figure 16:
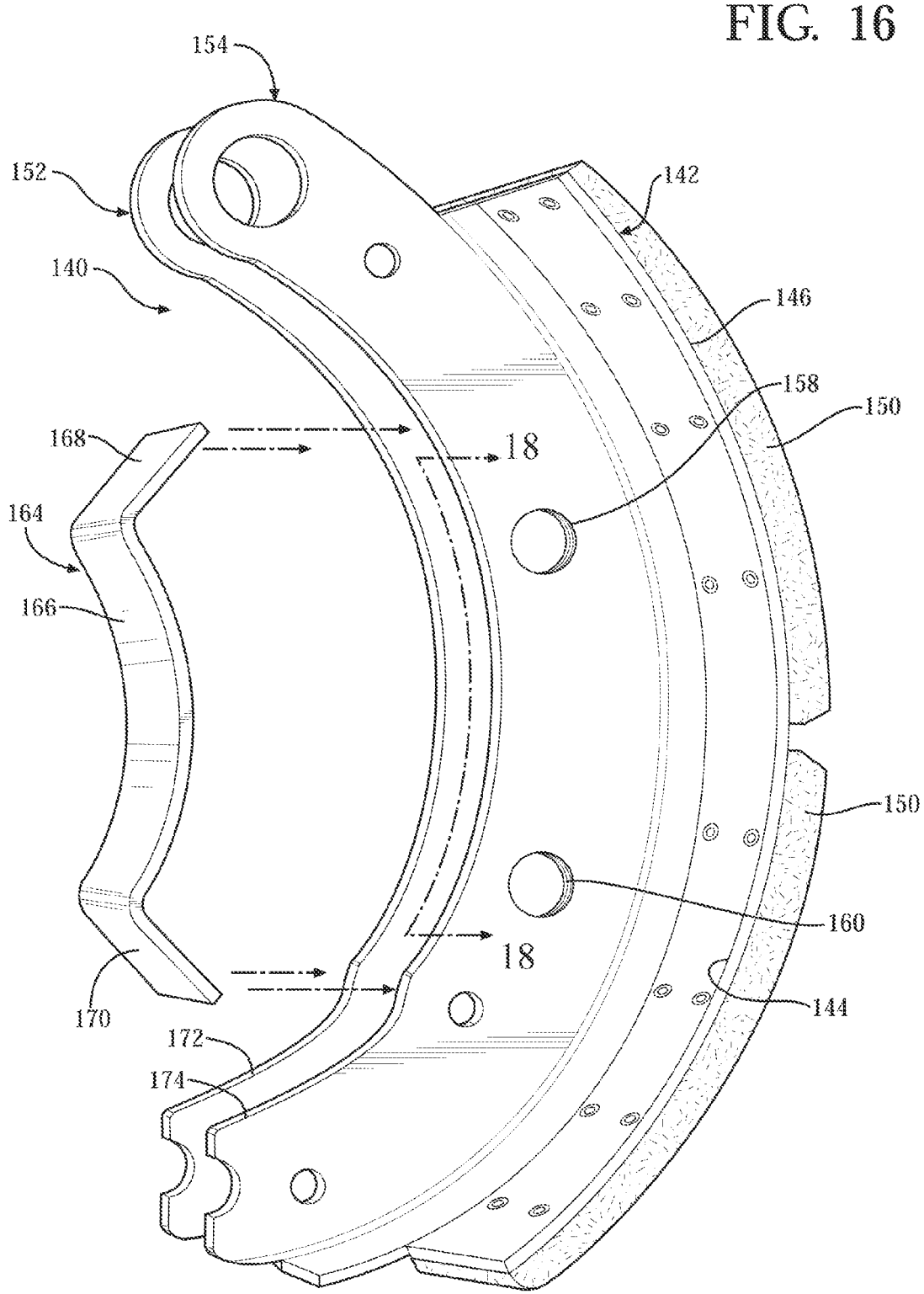
FIG. 16 is a perspective view of another aspect of a liquid cooled vehicle brake.

By way of example only, the water jacket 164 has an elongated, arcuate central wall 166 with two depending end walls 168 and 170, one extending outward from opposed ends of the central wall 166. Although the central wall 166 may be planar in form, it is also feasible, as shown in FIG. 16, for the central wall 166 to have an arcuate shape generally complimentary to the arcuate shape of the webs 152 and 154.

Figure 19:
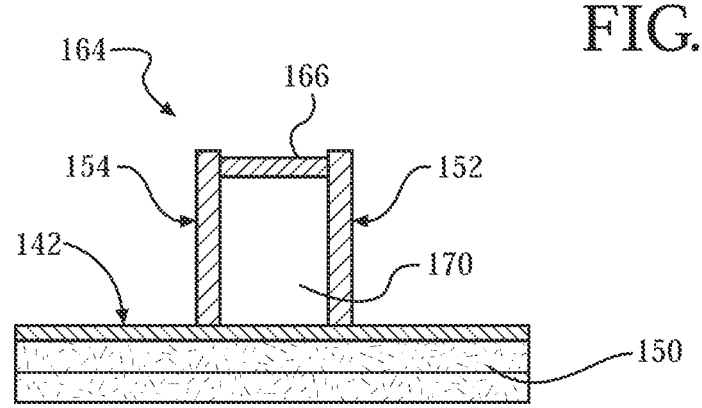
FIG. 19 is a cross-sectional view generally taken along line 19-19 in FIG. 18.

As shown in FIGS. 17-19, the end walls 168 and 170 of the water jacket 164 have an overall length so as to dispose the entire water jacket 164 flush or slightly inside of the outer edges 172 and 174 of the webs 152 and 154, respectively. Although welding can also be employed to sealingly join all of the adjacent surfaces and edges of the water jacket 162 to the inner surfaces of the webs 152 and 154, other fastening means can also be employed.

As shown in FIGS. 17 and 18, the end walls 168 and 170 of the water jacket 164 are disposed circumferentially beyond the annular extent of the spaced inlet port 158 and outlet port 160. The water jacket 164, in combination with the webs 152 and 154, thus forms a sealed coolant chamber 176 for coolant flow through the inlet port 162, through the coolant chamber 176, and then out through the outlet port 160.

Suitable coolant connections, such as threaded connections 180 and 182 in the form of threaded plugs, by example, are fixedly secured, such as by threading, welding, etc., to the bores forming the inlet port 158 and the outlet port 160. The threaded connectors 180 and 182 receiving mating connectors 184 and 186, respectively mounted on fluid coolant conduits or hoses 188 and 190 respectively. The fluid conduits or hoses 188 and 190 are coupled to a fluid flow source, such as that shown in FIGS. 14 and 15, to create coolant flow through the coolant passage 176 formed in the brake shoe 140.

Figure 20:
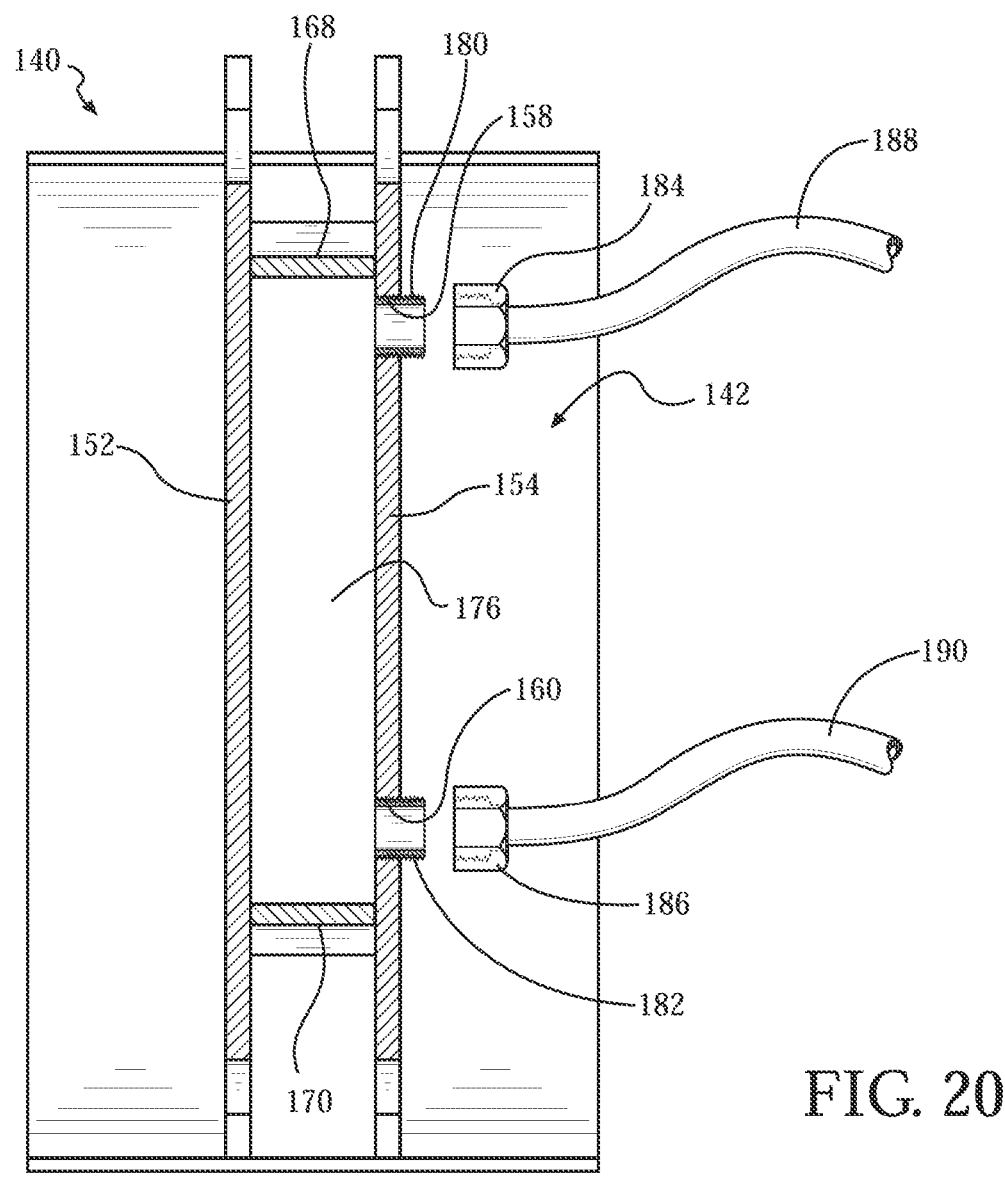
FIG. 20 is a partial, exploded cross-sectional view showing the fluid connections to the liquid cooled brake shoe shown in FIGS. 16-19.

It should be noted that the coolant chamber or passage 176 is formed, in part, by using the existing pair of spaced webs 152 and 154 found on certain brake shoes 140. Only a simple water jacket 164 and the inlet and outlet fluid connections, shown in FIG. 20, is required to complete the liquid cooled brake apparatus.

Any of the alternate flow passage modifications including the interior flange 134 shown in FIG. 10, and the heat conductive members 124, 126, and 128 or 138 shown in FIGS. 11 and 12 may be employed in conjunction with a water jacket 164.

Figure 14:
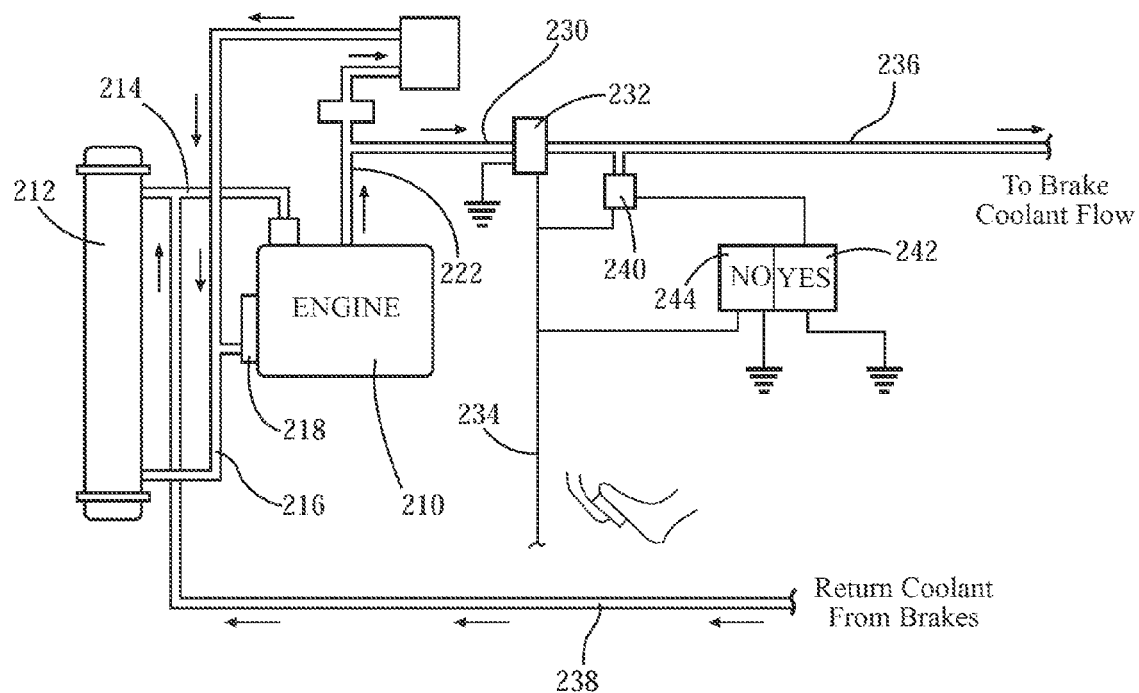
FIG. 14 is a pictorial representation of one aspect of a liquid cooled brake control system.

A brake coolant flow control system is depicted in FIG. 14. An internal combustion engine 210 is coupled to a radiator 212 by means of a first coolant flow loop formed of a first conduit 214 coupling the engine coolant flow passage to the top portion of the radiator 212 and a second conduit 216 connecting the bottom of the radiator 216 to the engine coolant flow passage through the water pump 218.

The engine 210 is also fluidically coupled by a second fluid flow loop to a passenger compartment heater 220. The second fluid flow loop includes a first conduit 222 coupled between the engine 210 and an inlet of the heater 220, and a second conduit 224 coupled between an outlet of the heater 220 and a second conduit 216 of the engine/radiator fluid flow loop.

A brake coolant flow loop is formed of a first conduit 230 branching off of the first heater conduit 222. The first conduit 230 is coupled to a diverter valve 232, such as a normally closed solenoid operated valve. A solenoid coil receives an input signal, as described hereafter, to cause the diverter valve, 232 to open thereby allowing a coolant flow through the brake coolant flow passages 40, 70, 92, 212 or 221 as shown in various aspects of the liquid cooled brake described above.

The input signal to the coil of the diverter valve 232 maybe a 12 volt D.C. signal from the vehicle brake stoplight or the brake pedal actuation switch as shown by a signal line 234.

The outlet of the diverter valve 232 is coupled to an inlet conduit 236 which is coupled to the inlet of the brake coolant passages 40, 70, 92, 112, or 221 shown in the various aspects described above.

The outlet of the liquid brake cooling passage is coupled to a conduit 238 which is connected to the first conduit 214 of the engine/radiator coolant flow loop so as to return the heated coolant fluid from the brakes to the top portion of the radiator 212.

A safety feature is also provided in the brake coolant flow circuit shown in FIG. 14. A pressure switch 240 is coupled to the brake fluid flow conduit 236. The pressure switch 240 can be a normally opened pressure switch which is adapted to move to a closed position at a certain detected fluid pressure, such as 10 psi, for example. When the pressure switch 240 is open, since the fluid pressure is under 10 psi indicative of good coolant flow, an output signal from the pressure switch 240 can be used to turn on a coolant supply indicator, such as a light 242 located on the vehicle instrument panel, to provide an indication to the vehicle driver that the brake coolant system is operating. When the pressure switch 240 detects a coolant flow pressure in the conduit 236 greater than the set pressure, such as greater than 10 psi, the output signal from the pressure switch 240 can be used to generate an error signal depicted by reference number 244 which can be supplied to the vehicle instrument panel or the vehicle control computer to provide an operational warning that the brake coolant is experiencing an overpressure condition.

Figure 15:
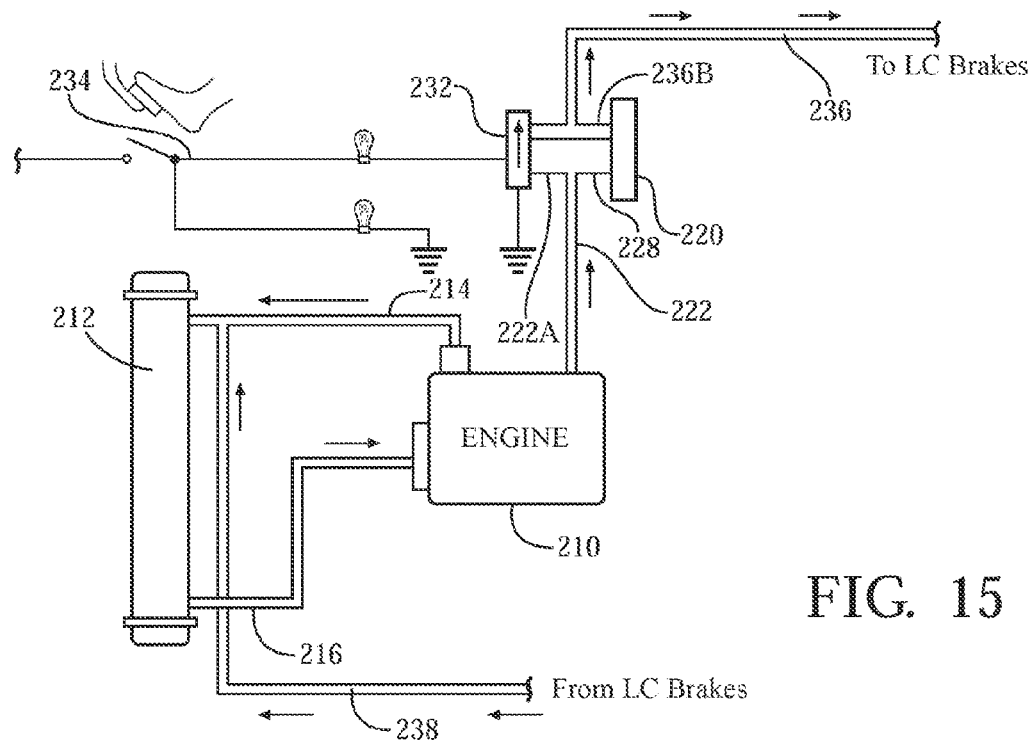
FIG. 15 is a pictorial representation of another aspect of a liquid cooled brake control system.

Referring now to FIG. 15, there is depicted another aspect of a liquid cooled brake coolant flow control circuit. The normally closed diverter valve 232, in this aspect, is fluidically coupled in parallel with the passenger heater core 220 in the event that the heater core 220 becomes plugged or experiences reduced fluid flow over time. The conduit 222 from the engine branches into sub-conduits 222A and 222B which respectively flow to the diverter valve 232 and the heater core 220.

The outlets of the diverter valve 232 and heater core 220 are coupled to sub-conduit 236A and 236B, respectively which tee together then flow into the brake line fluid flow conduit 236.

What is claimed is:

1. A liquid cooled vehicle brake shoe comprising:
    an annular rim carrying a layer of a brake friction material on a radially outer surface, the rim having a radially inner surface opposed from the radially outer surface;
    a first and second spaced rim structural support webs, each extending perpendicularly to and radically inward from the radially inner surface of the rim and joined to the radially inner surface of the rim along an annular edge, the first and second spaced rim structural support webs comprising a mounting surface for a brake shoe on a vehicle; and
    a water jacket sealingly joined between the first and second spaced rim structural support webs circumferentially beyond the annular extent of an inlet port and an outlet port formed in at least one of the first and second spaced rim structural support webs to form a closed interior defined by the water jacket, the first and second spaced rim structural support webs, and the inner surface of the rim and comprising a fluid flow passage between the inlet port and the outlet port for circulating fluid in heat transfer relationship directly over the radially inner surface of the rim to remove heat from the layer of brake friction material.

2. The brake shoe of claim 1 wherein:
    the first and second spaced rim structural support webs are integrally formed with the rim.

3. The brake shoe of claim 1 further comprising:
    a heat conductive member disposed within the layer of brake friction material and coupled in heat transfer relationship with the rim.

4. The brake shoe of claim 3 wherein the heat conductive member comprises:
    at least one body formed of a high thermal conductive material.

5. The brake shoe of claim 1 further comprising:
    a plurality of heat conductive members disposed within the layer of brake friction material and coupled in heat transfer relationship with the rim.

6. The brake shoe of claim 1 further comprising:
    a heat radiator member coupled in heat transfer relationship with the rim, the heat radiator member disposed in the fluid flow passageway within the water jacket and the pair of support webs.

7. The brake shoe of claim 6 further comprising:
    a heat conductive member disposed with the layer of brake friction material, and coupled in heat transfer relationship with the rim, the heat conductive member axially aligned with the heat radiator member.

8. The brake shoe of claim 1 further comprising:
    the inlet port and the outlet port formed in at least one of the first and second spaced rim structural support webs to define a fluid flow inlet and a fluid flow outlet port in fluid communication with the fluid flow passage.

9. The brake shoe of claim 8 further comprising:
    fluid conduit connection members mounted in the inlet port and the outlet port to couple fluid conduits to the inlet port and the outlet port.

10. The brake shoe of claim 1 wherein the water jacket is a one piece member extending between the first and second spaced rim structural support webs and sealingly joined at exterior surfaces to the first and second spaced rim structural support webs and the radially inner surface of the rim.

11. The brake shoe of claim 1 wherein the water jacket comprises:
    a central wall and a pair of first and second end portions projecting from the central wall.

12. The water jacket of claim 11 wherein:
    the central wall has an arcuate shape complimentary to an arcuate shape of inner edges of the first and second spaced rim structural support webs.

\* \* \* \* \*